No. 856,877.
PATENTED JUNE 11, 1907.
C. A. HULTQUIST.
ROCK DRILL CHUCK.
APPLICATION FILED SEPT. 20, 1906.
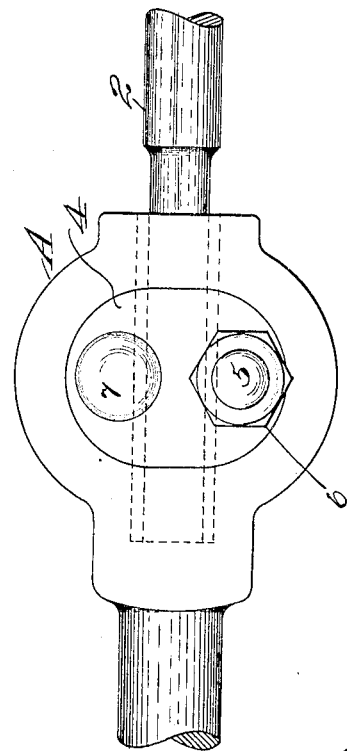
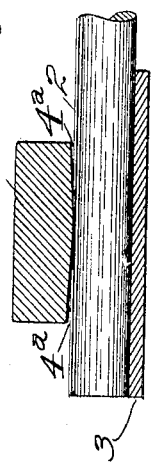
WITNESSES:
INVENTOR
Charles A. Hultquist
BY
Geo. H. Strong,
ATTORNEY

UNITED STATES PATENT OFFICE.

CHARLES A. HULTQUIST, OF LOWELL, ARIZONA TERRITORY.

ROCK-DRILL CHUCK.

No. 856,877.  Specification of Letters Patent.  Patented June 11, 1907.

Application filed September 20, 1906. Serial No. 335,405.

*To all whom it may concern:*

Be it known that I, CHARLES A. HULTQUIST, a citizen of the United States, residing at Lowell, in the county of Cochise and Territory of Arizona, have invented new and useful Improvements in Rock-Drill Chucks, of which the following is a specification.

My invention relates to an improved rock drill holding chuck; and it consists in the combination and arrangement of parts, and in details of construction which will be more fully explained by reference to the accompanying drawings, in which—

Figure 1 is a side elevation. Fig. 2 is a transverse section. Fig. 3 is a longitudinal section of the key and bushing, showing the drill-shank in elevation.

In rock drills it is customary to secure the drill shank to the piston rod or other part by which the drill is actuated, by means of a chuck having an opening to receive the end of the drill shank, and by means of a key and bolts the drill is clamped into the chuck.

It is the object of my invention to provide improvements in such chucks, and means by which the drill can be more securely locked in place, and easily removed from the chuck when required.

A is the chuck having a bore made into one end to receive the drill shank 2.

3 is a bushing such as is commonly used in rock drills. Opposed to this bushing is the key 4 which fits into a chamber upon the opposite side of the chuck from the bushing 3, and the key has a segmental channel on its inner face corresponding with and opposed to the bushing so that when the drill shank has been inserted between the two, the key may be drawn firmly against the shank by bolts, thus clamping the drill shank firmly in place. This key is preferably made oval in transverse section, as shown in Fig. 1, but it might be made round or of other forms.

The segmental channel which fits the drill shank is made a little larger or slack at the ends as indicated at 4ª Fig. 3 so that it acts as an equalizer, making the strain always the same on both bolt-holes, and holding the drill very securely, while at the same time saving the holes.

Holes are bored through the key and the chuck to receive the holding bolts 5, and by means of nuts 6 screwed upon the ends of the bolts, the parts are clamped together to bind upon the drill.

In my invention I countersink one hole in the key which receives the bolt-head, and the hole upon the opposite side of the chuck which receives the other bolt-head, so that these bolt-heads lie substantially flush upon opposite sides and the nuts 6 correspondingly project upon the opposite ends of the bolts which extend through the chuck and the key.

By this construction it is possible to apply a wrench and remove the nuts without interfering with the head of the other bolts; and it also makes it easy to get at both ends without turning the chucks which it is necessary to do with the ordinary construction of chucks and which is difficult if the drill sticks in the hole.

With this chuck the miner can get at both nuts without turning the chuck since they are on opposite sides.

In order to prevent the bolts from turning when setting up the nuts, the bolt-heads 7 are made eccentric to the shank of the bolt, and the key 4 and chuck A are bored to receive these eccentric heads as shown, so that when they are in place, the nuts can easily be turned on or off without any danger of turning the bolts.

It will be understood that the heads might be made polygonal and the correspondingly shaped socket made to receive them, but the form here shown enables the sockets to be bored out, and of inexpensive construction.

Having thus described my invention, what I claim and desire to secure by Letters Patent is—

1. A drill chuck having a socket to receive the drill shank, a key fitting a chamber upon one side of the shank, and adapted to be compressed upon the drill shank, bolts extending through the key and the chuck upon opposite sides of the drill shank, said bolts having cylindrical heads eccentric to the body portion, correspondingly shaped sunken chambers in the key and the chuck upon opposite sides adapted to receive the heads of the bolts and nuts turnable upon the opposite ends of the bolts to lock the drill shank in the chuck, said chambers and bolt holes not intersecting the segmental drill-holding channels.

2. A drill chuck having a socket and a drill shank fitting therein, a key fitting a countersunk chamber upon one side of the chuck, and bolts by which said key is caused to clamp the drill shank within the chuck, said key having the ends constructed to make a slack fit whereby the key acts as an equalizer for the strain upon the bolts.

In testimony whereof I have hereunto set my hand in presence of two subscribing witnesses.

CHARLES A. HULTQUIST.

Witnesses:
 JAS. BERGMAN,
 F. J. HOGAN.